(12) United States Patent
Brown

(10) Patent No.: US 7,613,480 B2
(45) Date of Patent: Nov. 3, 2009

(54) MULTIPLE SUBSCRIPTION SUBSCRIBER IDENTITY MODULE (SIM) CARD

(75) Inventor: Jason Brown, Round Rock, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 918 days.

(21) Appl. No.: 10/750,195

(22) Filed: Dec. 31, 2003

(65) Prior Publication Data

US 2005/0164737 A1      Jul. 28, 2005

(51) Int. Cl.
*H04B 1/38* (2006.01)
(52) U.S. Cl. .................... 455/558; 455/556.1
(58) Field of Classification Search ............... 455/411, 455/423, 556.1, 557, 558
See application file for complete search history.

(56) References Cited

U.S. PATENT DOCUMENTS

| | | | |
|---|---|---|---|
| 6,457,164 B1 * | 9/2002 | Hwang et al. ............... 716/8 |
| 7,149,545 B2 * | 12/2006 | Hurst et al. ............... 455/558 |
| 2003/0119482 A1 * | 6/2003 | Girard ............... 455/411 |
| 2003/0224823 A1 * | 12/2003 | Hurst et al. ............... 455/558 |
| 2004/0068653 A1 * | 4/2004 | Fascenda ............... 713/168 |

* cited by examiner

Primary Examiner—Sam Bhattacharya
(74) Attorney, Agent, or Firm—Moazzam & Associates, LLC

(57) ABSTRACT

Embodiments of the invention include a multiple subscription subscriber identity module (SIM) card. The SIM card includes a plurality of sets of subscription parameters from which to select and activate a single set of parameters. The sets of subscription parameters each contain various information, e.g., information such as an Integrated Circuit Card Identifier (ICCID) and an International Mobile Subscriber Identity (IMSI), and are based on various criteria, e.g., different service regions of use for the electronic device on which the SIM card is installed. A set of subscription parameters is selected for a particular region of use either manually or automatically. The SIM card, which can include a software interface that provides a list of available sets of subscription parameters, is activated by updating the selected set of subscription parameters. Alternatively, a default set of subscription parameters is selected unless a different set of subscription parameters is selected manually from among the plurality of sets of subscription parameters. According to alternative embodiments of the invention, the selected set of subscription parameters can be deactivated and a different set of subscription parameters can be selected and updated to in the SIM card.

16 Claims, 2 Drawing Sheets

MULTIPLE SUBSCRIPTION SUBSCRIBER IDENTITY MODULE (SIM) CARD

BACKGROUND OF THE INVENTION

1. Field of Invention

The invention relates to subscriber identity module (SIM) cards for portable electronic devices such as mobile and wireless telephones. More particularly, the invention relates to multiple subscription SIM cards in such portable devices.

2. Description of Related Art

Smart cards conventionally are used in many types of portable electronic devices, especially communication devices, for storing data, enabling access to a particular network or account, or configuring such devices to perform different functions. Such cards typically are made of plastic and have an electronic chip module mounted or embedded therein. The electronic chip module typically is a semiconductor chip including an integrated circuit with a microprocessor and memory, if appropriate, and contact or connection points for electrically connecting the terminals of the integrated circuit to the contact interface of the electronic device in which the card is inserted.

For example, many mobile or wireless telephones use cards with a subscriber identity module (SIM) to enable a user to access the wireless telephone network in a particular market or region of the country. The SIM typically is equipped with an electrically erasable programmable read-only memory (EEPROM) that has stored therein various information needed to operate and properly configure the SIM, and to identify the mobile phone user. Such information, which typically is thought of or referred to as a set of subscription parameters, includes the identity of the user and/or user account, and the network in which the user account is activated. For example, the set of subscription parameters stored in the SIM may include the user's mobile telephone number, an Integrated Circuit Card Identifier (ICCID), and an International Mobile Subscriber Identity (IMSI).

Some wireless telephone service providers have a different type of SIM card, for different service regions or markets throughout the country, e.g., when two or more regional service providers consolidate their operations. In such cases, it usually is not possible to simply consolidate the SIM supply because subscription information resident on the SIM is tied to the original region. Having different types or stock keeping units (SKUs) of SIMs often creates difficulties for the service provider and retailers. For example, mobile phone retailers have to maintain the multiple SIM SKUs if they are selling to mobile telephone customers in different service markets or regions.

Accordingly, it would be desirable to have available a single type of SIM card suitable for use in different service markets or regions without having to redesign existing network and IT systems.

SUMMARY OF THE INVENTION

The invention is embodied in a multiple subscription subscriber identity module (SIM) card and a method for activating a specific set of subscription parameters on a multiple subscription SIM card. The SIM card includes a plurality of sets of subscription parameters from which to select and activate a single set of subscription parameters. The sets of subscription parameters are based on various criteria, e.g., different service regions of use for the electronic device into which the SIM card is installed. According to embodiments of the invention, the retailer, the user or even the service provider can select the appropriate set of subscription parameters for the user's particular region of use by various means, e.g., via a software interface that displays the available sets of subscription parameters, e.g., by providing a list of the available sets of subscription parameters that are electronically stored on the SIM. The different sets of subscription parameters each contain various information, e.g., information such as an Integrated Circuit Card Identifier (ICCID) and an International Mobile Subscriber Identity (IMSI). Activating the SIM card includes updating the SIM with the selected set of subscription parameters. According to alternative embodiments of the invention, a default set of subscription parameters is selected unless a different set of subscription parameters is selected manually from among the plurality of sets of subscription parameters. In these alternative embodiments, a set of subscription parameters is selected automatically by the SIM, depending on various criteria, e.g., which communications network or network region onto which the SIM card first registers. The method for activating a set of subscription parameters includes providing a SIM card that has stored thereon a plurality of sets of subscription parameters, accessing, e.g., via a software interface, the plurality of sets of subscription parameters, selecting a desired set of subscription parameters, and updating the SIM card with the selected set of subscription parameters. According to alternative embodiments of the invention, the selected set of subscription parameters can be deactivated and a different set of subscription parameters can be selected and updated in the SIM card.

DETAILED DESCRIPTION OF EXEMPLARY EMBODIMENTS

Figure 1:
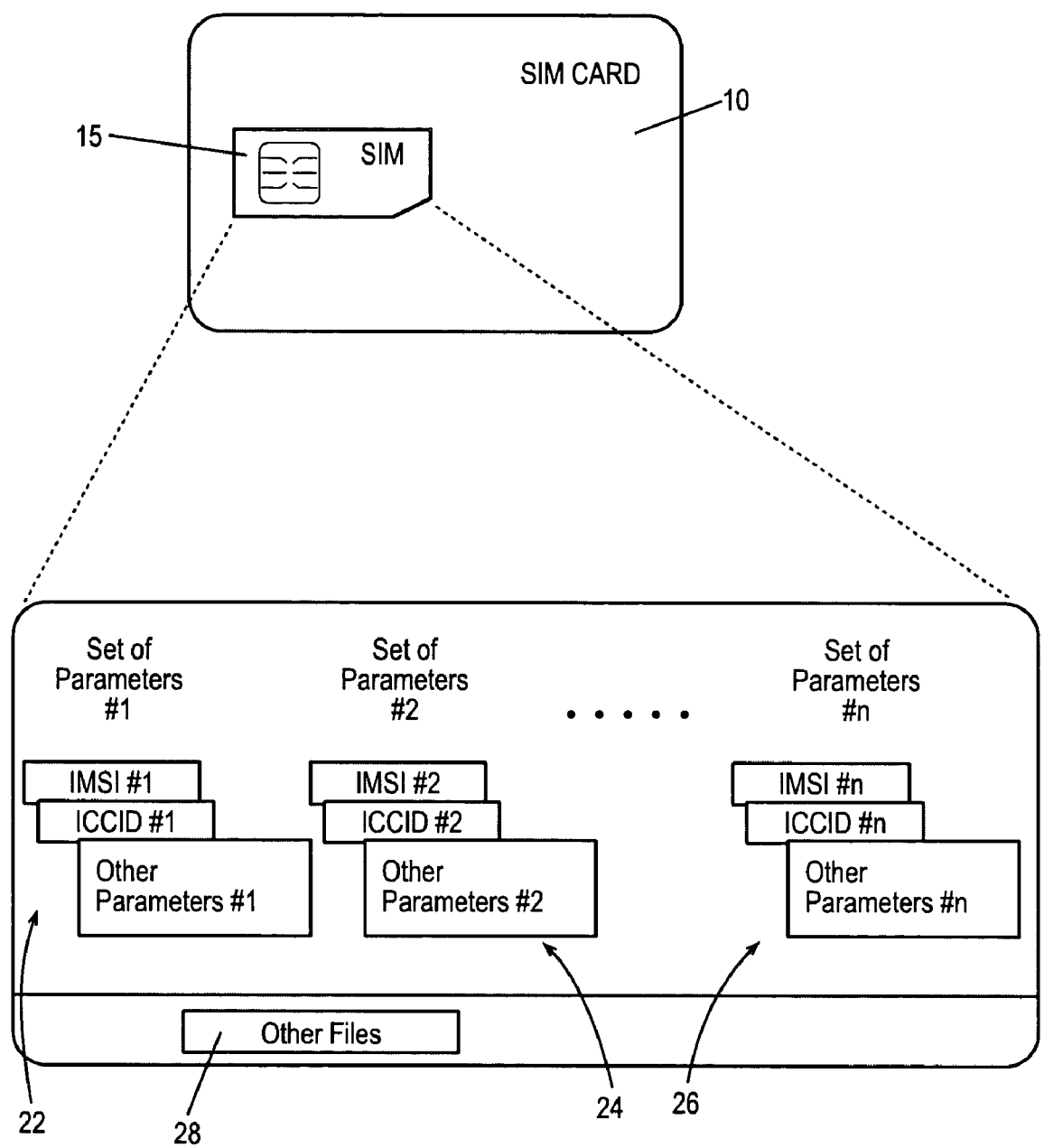
FIG. 1 is a simplified schematic diagram of a subscriber identity module (SIM) card according to an embodiment of the invention.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a simplified schematic diagram of a subscriber identity module (SIM) card 10 according to an embodiment of the invention. The SIM card 10 typically fits into a slot or other appropriate location in an electronic device, such as a mobile or wireless telephone (not shown). The SIM card 10 typically has appropriate contacts that allow the SIM card 10 to interface or electrically connect with the contact interface of the electronic device. Also, the SIM card 10 typically has appropriate software components stored therein to interface with various software components of the electronic device.

The SIM card 10 typically is made of plastic or other suitable material and has mounted or otherwise coupled thereon or embedded therein a subscriber identity module (SIM) 15. Typically, the SIM 15 includes a semiconductor chip that has an integrated circuit with memory, including, e.g., an electrically erasable programmable read-only memory (EEPROM). The SIM 15 contains electronically-stored information such as configuration information necessary to allow an electronic device such as a mobile telephone to access particular communication networks and perform other functions. Such configuration information includes configuration files, e.g., conventional GSM files and other communication network configuration files.

The SIM 15 also has electronically-stored information such as identification information for the electronic device, the user of the electronic device and/or the account or accounts of the user of the electronic device. For example, in mobile telephones, the SIM 15 contains user identification information such as the mobile telephone number of the user, an SIM card serial number, i.e., an Integrated Circuit Card Identifier (ICCID), and an International Mobile Subscriber Identity (IMSI). Such information is stored in standard GSM files on the SIM 15. Also, the SIM 15 contains other data such as Pin codes, security keys, application files, user setting files, and account feature setting files.

The information contained in a SIM constitutes a unique set of subscription parameters that identifies the user, the user device and/or the market or region in which the device is used. Conventionally, some mobile or wireless phone service providers have different types of SIMs, i.e., different SIM stock keeping units (SKUs), based on the potential or available markets or regions in which the mobile phone can be activated. That is, some service providers have different SIM sets of subscription parameters for the different service regions or markets. Thus, some service providers often must keep an inventory of different SIM SKUs or be able to supply different SIM SKUs for different market regions.

However, in general, service providers and retailers who sell to users desire one type of SIM card that can be activated in any region or market in the country. Otherwise, the retailer must purchase and stock different SIM SKUs for different regions in which they sell to users. The maintenance of different SIM SKUs for different markets or regions is inefficient and thus disadvantageous for retailers and customers, as well as for the wireless service providers and other providers of SIM cards.

According to embodiments of the invention, the SIM card 10 includes a single SIM SKU having stored thereon multiple sets of subscription parameters. The multiple sets of subscription parameters are stored on the SIM 15 in an appropriate manner, e.g., using non-standard application files. The multiple sets of subscription parameters provide flexibility for a user, retailer, service provider or other party to select which set of subscription parameters to use when activating the electronic device in which the SIM card 10 is used. For example, according to embodiments of the invention, the SIM 15 contains different sets of subscription parameters for various markets or regions in which a service provider provides service. In this manner, the user, retailer, service provider or other party can select which set of subscription parameters to use from among the plurality of sets of subscription parameters stored on the SIM 15.

Thus, from a service provider perspective, the service provider or other party that supplies SIMs and/or SIM cards need only provide a single type of SIM (i.e., a single SIM SKU) to retailers, regardless of, e.g., the number of markets or regions in which the SIM will be used. Similarly, from a retail and user perspective, retailers need only stock one SIM SKU for all available markets or regions. The multiple subscription SIM allows the mobile phone or other electronic device to be adaptable to different criteria, e.g., different markets or regions, by allowing a particular set of subscription parameters to be activated on the SIM 15, depending on the market or region in which the SIM 15 is to be used.

As shown generally in FIG. 1, according to embodiments of the invention, the SIM 15 has stored thereon a plurality of sets of subscription parameters, with each set of subscription parameters including identification and configuration information for a different type of operation. For example, the multiple sets of subscription parameters can be based on different operating markets or regions, as discussed hereinabove. However, according to embodiments of the invention, the content of the multiple sets of subscription parameters can be based on any distinct type of operation or other criteria. That is, the multiple sets of subscription parameters may represent various criteria, e.g., different types of users, different types of user accounts, different types of electronic device features or functions, different network operating regions, or different types of operating networks.

For example, the SIM 15 includes a first set of subscription parameters (shown generally as 22), which includes user information, e.g., an IMSI (IMSI #1), an ICCID (ICCID #1), and any other necessary parameters needed for operating the SIM 15 in, e.g., a first market or region. The SIM 15 also includes a second set of subscription parameters (shown generally as 24), which also includes user information, e.g., an IMSI (IMSI #2), an ICCID (ICCID #2), and other necessary parameters needed for operating the SIM 15 in a second region. The SIM 15 also includes additional sets of subscription parameters (shown generally as 26), which contain corresponding information as the first and second sets of subscription parameters, but are particular to the different region of use. According to embodiments of the invention, the number of sets of subscription parameters included in the SIM 15 depends on various criteria, e.g., the number of potential regions in which the SIM 15 can be activated.

According to embodiments of the invention, the particular set of subscription parameters selected for use in the SIM 15 is chosen manually prior to activation of the SIM 15 by various means, e.g., via a software interface, which will be discussed in greater detail hereinbelow. Alternatively, the chosen set of subscription parameters is selected automatically based on certain criteria, e.g., the network region onto which the SIM 15 first registers.

According to an embodiment of the invention, one of the plurality of sets of subscription parameters is established as a default set of subscription parameters. In such embodiment, the default set of subscription parameters is selected automatically as the set of subscription parameters to be used by the SIM 15. As will be discussed in greater detail hereinbelow, the automatic selection of the default set of subscription parameters is made at certain times, e.g., upon activation of the SIM 15 or, alternatively, upon the occurrence of some other event (e.g., the initial or subsequent power-up or registration of the SIM 15). In this manner, the default set of subscription parameters will be selected unless the retailer or user selects a different set of subscription parameters that is not the default set of subscription parameters.

The SIM 15 also includes other information, e.g., conventional operation and configuration information and files, that is not dependent on which set of subscription parameters is selected, i.e., not dependent on the particular region of use of the SIM 15. Such information (shown as 28) includes, e.g., security data including authentication data, PIN codes, personal unblocking key (PUK) codes, over-the-air (OTA) security keys, and other application files and user setting information.

Figure 2:
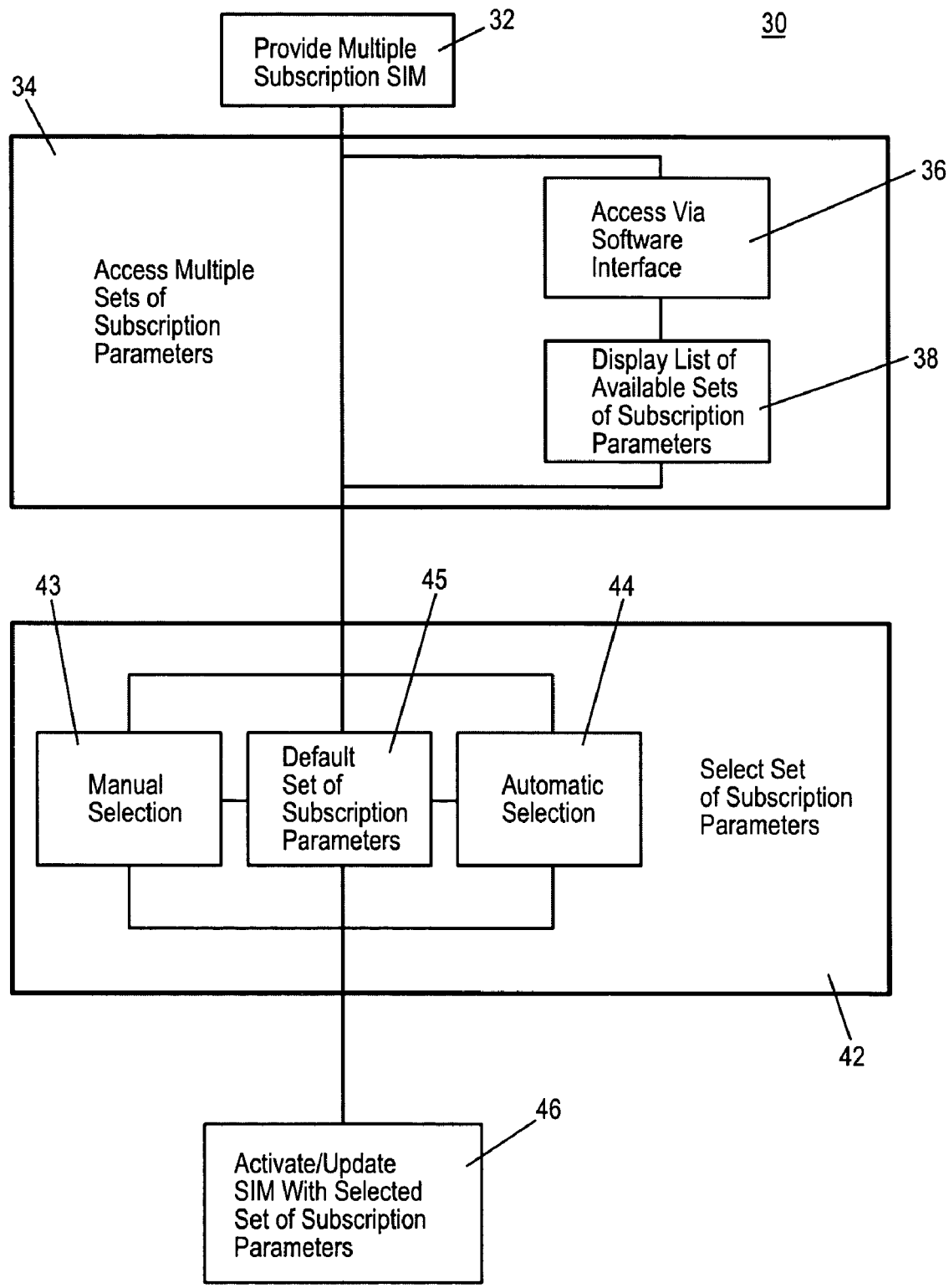
FIG. 2 is a simplified block diagram of a method for activating a set of subscription parameters on a multiple subscription SIM card according to embodiments of the invention.

As discussed hereinabove, according to embodiments of the invention, the set of subscription parameters to be selected depends on criteria such as the region or market in which the SIM 15 is to be activated. Referring now to FIG. 2, shown is a simplified block diagram of a method 30 for activating a set of subscription parameters from a plurality of sets of subscription parameters on a SIM card according to embodiments of the invention.

The first step 32 of the method 30 is to provide a SIM 15 with multiple sets of subscription parameters stored thereon. As discussed hereinabove, according to embodiments of the invention, the SIM 15 includes multiple sets of subscription parameters, with each different set of subscription parameters based on various criteria, e.g., the potential market or region in which the SIM 15 is to be used.

The next step 34 is to access the multiple sets of subscription parameters available on the SIM 15. The multiple sets of subscription parameters are stored on the SIM 15, in application files, i.e., electronically stored in a memory portion of the SIM 15.

Access to the multiple sets of subscription parameters is achieved via any suitable manner. According to an embodiment of the invention, the multiple sets of subscription parameters are accessed via a software interface loaded onto the SIM 15 (shown as step 36). For example, the software interface interacts with a terminal and displays or otherwise provides a list of sets of subscription parameters available on the SIM 15 (shown as step 38) from which to chose a desired set of subscription parameters. Alternatively, the software interface causes the terminal to display a menu-based program that allows a user to select the desired set of subscription parameters.

Once the user accesses the sets of subscription parameters available on the SIM 15, the next step 42 is for the user to select the desired set of subscription parameters to be used in the SIM 15. Depending on the how the available sets of subscription parameters are accessed, the desired set of subscription parameters is selected, e.g., from a list of available choices, from a menu-based arrangement, or in some other suitable manner. Once the desired set of subscription parameters are selected, they are saved and stored for use by the SIM 15.

For example, according to embodiments of the invention, the desired set of subscription parameters is selected manually (shown as step 43) or automatically (shown as step 44). With the manual selection step 43, the retailer or end user accesses the available sets of subscription parameters and manually (e.g., via the terminal) selects which set of subscription parameters to be used in the SIM 15. Alternatively, with the automatic selection step 44, a set of subscription parameters is selected by the SIM 15 automatically based on certain criteria, e.g., onto which network the terminal first registers. In this manner, neither the retailer nor the end user has to select the set of subscription parameters to be used.

In one embodiment, the automatic selection step 44 can allow a user to have a different set of subscription parameters for various regions or markets in which the user operates. In this embodiment, the device, upon first power-up, reads the network identification and automatically selects a set of subscription parameters based on the network ID. Upon power-up in a different network location, the device may or may not automatically select a different set of subscription parameters based on that network ID depending upon the preference of the network operator.

Also, as discussed briefly hereinabove, according to yet another embodiment of the invention, a default set of subscription parameters is selected (shown as step 45). For example, a default set of subscription parameters is established based on certain criteria, e.g., based on the likely market or region in which the SIM 15 is to be used. With this selection step 45, the default set of subscription parameters is selected automatically at a desired time, e.g., upon initial or subsequent power-up or registration of the SIM 15. According to embodiments of the invention, the default set of subscription parameters can be supplanted by a different set of subscription parameters if desired by the user.

Once the desired set of subscription parameters is selected, the next step 46 is to update the SIM 15 with the chosen set of subscription parameters and activate the SIM 15 using the selected set of subscription parameters. In this manner, the desired set of subscription parameters, in effect, becomes the default set of subscription parameters for the SIM 15. The SIM 15 is updated with the selected set of subscription parameters, e.g., in a conventional manner. That is, the selected set of subscription parameters is saved in a portion of the SIM memory that is accessed by the terminal when the SIM 15 is initially or subsequently powered up. Once the selected set of subscription parameters is accessed by the SIM 15, the SIM 15 is activated using the selected set of subscription parameters and is ready for operation. In this manner, the selected set of subscription parameters are copied from the application files to the corresponding standard GSM files, from where they can be accessed by the terminal.

According to embodiments of the invention, the selection of a desired set of subscription parameters may or may not be permanent. That is, as desired, one selected set of subscription parameters can be deactivated and a different set of subscription parameters can be selected and activated. According to embodiments of the invention, a set of subscription parameters can be activated, deactivated and reactivated as many times as desired. In general, the ability to activate and deactivate different sets of subscription parameters provides the user with the flexibility to use the same SIM 15 in different regions or markets.

For example, the SIM 15 may be distributed with no default set of subscription parameters, and instructions to activate the selection of a set of subscription parameters may be based on the retailer or user entering a specific value for the voicemail number or the mobile subscriber ISDN (MSISDN) through the terminal interface. Once the desired set of subscription parameters is selected and the SIM 15 is activated with the selected set of subscription parameters, the SIM 15 may be instructed to deactivate the application for selecting the set of subscription parameters.

Alternatively, the SIM 15 can be programmed to ask automatically upon SIM power-up or registration for the desired set of subscription parameters. This option can occur each time the SIM is powered up for operation or, alternatively, this option can be programmed to automatically turn off once an initial set of subscription parameters is selected. Also, alternatively, it is possible to reinstate this option by manually selecting that the SIM ask for the desired set of subscription parameters automatically or manually, whether or not an initial desired set of subscription parameters has been selected.

The SIM according to embodiments of the invention provides advantageous flexibility to service providers who currently may be supplying retailers with different SIM SKUs that each have a single subscription parameter set. Embodiments of the invention allow such a service provider to supplement their current inventory of single set SIMs with SIMs according to embodiments of the invention. Also, embodiments of the invention allow the service provider to gradually migrate over to multiple subscription SIMs according to embodiments of the invention without discarding existing inventory.

It will be apparent to those skilled in the art that many changes and substitutions can be made to the embodiments of the invention herein described without departing from the spirit and scope of the invention as defined by the appended claims and their full scope of equivalents. For example, the invention could be applied to electrical communication distribution systems.

The invention claimed is:

1. A multiple subscription subscriber identity module (SIM) card for use with portable devices, said card comprising:
   a subscription identity module (SIM) coupled to said card, said SIM including a plurality of sets of subscription parameters and a software user interface for allowing a user to select which one of the plurality of sets of subscription parameters to active,
   wherein a single set of subscription parameters is selected by the user from among the plurality of sets of subscription parameters and wherein the selected set of subscription parameters is activated.

2. A multiple subscription SIM card as recited in claim 1, wherein at least one set of subscription parameters corresponds to one of a plurality of different operating markets of use for the SIM card.

3. A multiple subscription SIM card as recited in claim 1, wherein the SIM has a default set of subscription parameters from among the plurality of sets of subscription parameters, wherein the default set of subscription parameters is selected unless a set of subscription parameters different from the default set of subscription parameters is selected.

4. A multiple subscription SIM card as recited in claim 1, wherein the software interlace is activated upon powering up the SIM card, unless one set of the plurality of subscription parameters has been selected/activated.

5. A multiple subscription SIM card as recited in claim 1, wherein the software interlace further comprises a menu-based software interface.

6. A multiple subscription SIM card as recited in claim 5, wherein, during activation of the card, the set of subscription parameters is automatically selected based on the market in which the SIM card is activated.

7. A multiple subscription SIM card as recited in claim 1, wherein at least one set of the plurality of sets of subscription parameters includes an Integrated Circuit Card Identifier (ICCID).

8. A multiple subscription SIM card as recited in claim 1, wherein at least one set of the plurality of sets of subscription parameters includes an International Mobile Subscriber Identity (IMSI).

9. A method for activating a set of subscription parameters on a subscriber identity module (SIM) card, comprising the steps of:
   providing a subscriber identity module (SIM) card having a subscription identity module (SIM) coupled to said card, said SIM including a plurality of sets of subscription parameters;
   providing a software user interface prompting a user to select which one of the plurality of sets of subscription parameters to activate;
   receiving the selection of the subscription parameter as inputted by the user; and
   activating the selected subscription parameter.

10. A method as recited in claim 9, further comprising the step of updating the SIM module with the selected set of subscription parameters.

11. A method as recited in claim 9, wherein at least one set of subscription parameters corresponds to one of a plurality of different operating markets of use for the SIM card, and wherein the selecting step further comprises activating the set of subscription parameters based on the operating market of use for the SIM card.

12. A method as recited in claim 9, wherein the SIM has a default set of subscription parameters from among the plurality of sets of subscription parameters, and wherein the selecting step further comprises activating the default set of subscription parameters unless a set of subscription parameters different from the default set of subscription parameters is selected.

13. A method as recited in claim 9, wherein the selecting step further comprises instructing the software interface to select one set of subscription parameters from among the plurality of subscription parameters and instructing the software interface to update the SIM module with the selected set of subscription parameters.

14. A method as recited in claim 9, wherein, upon powering up the SIM card, the software interface provides a list of available sets of subscription parameters unless a set of subscription parameters already has been activated.

15. A method as recited in claim 9, wherein the plurality of sets of subscription parameters are based on the markets of use of the SIM card, and wherein the selecting step further comprises automatically activating the set of subscription parameters based on the market in which the SIM card is to be used primarily.

16. A method as recited in claim 9, wherein the selecting step further comprises the steps of:
   deactivating the selected set of subscription parameters,
   selecting a different set of subscription parameters, and
   updating the SIM module with the newly selected set of subscription parameters.

* * * * *